United States Patent
Pattanaik et al.

(10) Patent No.: US 10,063,379 B2
(45) Date of Patent: Aug. 28, 2018

(54) DISTRIBUTED, CENTRALLY AUTHORED BLOCK CHAIN NETWORK

(71) Applicant: The Bank of New York Mellon, New York, NY (US)

(72) Inventors: Sarthak Pattanaik, Bernardsville, NJ (US); Vadim Pertsovskiy, Chicago, IL (US)

(73) Assignee: THE BANK OF NEW YORK MELLON, New York, NY (US)

( * ) Notice: Subject to any disclaimer, the term of this patent is extended or adjusted under 35 U.S.C. 154(b) by 0 days.

(21) Appl. No.: 15/625,946

(22) Filed: Jun. 16, 2017

(65) Prior Publication Data

US 2017/0366357 A1 Dec. 21, 2017

Related U.S. Application Data

(60) Provisional application No. 62/351,059, filed on Jun. 16, 2016.

(51) Int. Cl.
*H04L 9/32* (2006.01)
*H04L 29/06* (2006.01)
*G06Q 20/40* (2012.01)
*H04L 9/00* (2006.01)

(52) U.S. Cl.
CPC .......... *H04L 9/3247* (2013.01); *H04L 63/045* (2013.01); *H04L 63/062* (2013.01); *G06Q 20/401* (2013.01); *H04L 9/006* (2013.01)

(58) Field of Classification Search
CPC ......... H04L 9/3247; H04L 9/06; H04L 63/12; H04L 63/045; H04L 63/062; G06Q 20/401; G06Q 20/40

USPC .................................. 713/168, 171; 705/44
See application file for complete search history.

(56) References Cited

U.S. PATENT DOCUMENTS

| | | | | |
|---|---|---|---|---|
| 7,039,809 B1* | 5/2006 | Wankmueller | ....... | G06Q 20/401 705/72 |
| 9,992,028 B2* | 6/2018 | Androulaki | ............. | G06F 21/64 |
| 2015/0120569 A1 | 4/2015 | Belshe et al. | | |
| 2015/0294308 A1 | 10/2015 | Pauker et al. | | |
| 2015/0332283 A1* | 11/2015 | Witchey | ............... | G06Q 30/018 705/3 |

(Continued)

OTHER PUBLICATIONS

PCT International Search Report and Written Opinion, PCT Application No. PCT/US2017/038015, dated Sep. 15, 2017, 11 pages.

*Primary Examiner* — Shanto Abedin
(74) *Attorney, Agent, or Firm* — Fenwick & West LLP

(57) ABSTRACT

A central service provider manages and writes transaction details to a private block chain network. Blocks of transaction records written onto the block chain by the central service provider are distributed to members of the block chain, thereby enabling data resiliency and self-verifiability. As the full block chain is available to members of the block chain network, the central service provider also ensures the privacy of transaction details by providing an assembled header and encrypted block of transaction records that are generated using a combination of symmetric and asymmetric cryptographic techniques. Altogether, the full block chain network is distributed across members of the block chain, but the members can only access and read transaction details in the block chain that they are authorized to view.

20 Claims, 10 Drawing Sheets

(56) References Cited

U.S. PATENT DOCUMENTS

| | | |
|---|---|---|
| 2016/0086175 A1 | 3/2016 | Finlow-Bates et al. |
| 2016/0162897 A1 | 6/2016 | Feeney |
| 2016/0260169 A1* | 9/2016 | Arnold .................. G06Q 40/12 |
| 2017/0155515 A1* | 6/2017 | Androulaki ........... H04L 9/3263 |
| 2017/0277909 A1* | 9/2017 | Kraemer ............. G06F 21/6245 |
| 2017/0279783 A1* | 9/2017 | Milazzo ................ H04L 63/061 |

* cited by examiner

… (1)

DISTRIBUTED, CENTRALLY AUTHORED BLOCK CHAIN NETWORK

TECHNICAL FIELD

This disclosure generally relates to information transfer, and more specifically to a central service provider of a distributed block chain network that generates and transmits blocks of encrypted transaction records such that only select encrypted transaction records can be decrypted and viewed by a member of the block chain network.

BACKGROUND

Within any industry, there are numerous private networks built around specific central service services and/or assets. As an example, a private network built around a financial asset may include numerous members of the network such as a central service provider (e.g., banks and clearing agencies), regulating institutions, and clients that request the transfer of the financial asset.

A main concern in private networks, and any network in general, is ensuring that transactions concerning financial data remain private yet traceable. For example, a central service provider processing a transfer of a financial asset for a first client would not reveal the contents of that transfer to unauthorized clients that are not involved in the transfer. Conventionally, each member of the network can develop and maintain individual systems that can privately communicate with a central service provider and/or each other using various communication protocols. However, the different individual systems leads to a number of additional problems.

First, each individual system can be highly disparate, thereby requiring a significant investment in resources to ensure that a system can privately communicate with the central service provider and other members in the network. Second, each individual network may significantly differ in their level of implemented security. For example, each network can provide different approaches to encryption, authentication, data masking, and the like. Therefore, certain systems may be more susceptible to being compromised which can affect all members of the network. Third, there is a lack of data resiliency, meaning that if a central service provider is unavailable, then the data stored with the central service provider is similarly unavailable for access.

SUMMARY

A central service provider manages a private network and uses block chain(s) and cryptography to provide a block of transaction records to various members of the block chain. A transaction record includes details pertaining to a transaction. The central service provider encrypts transaction records to generate a block of transaction records such that each member is only able to decrypt and read a subset of transaction records in the block. Specifically, the transaction records in the subset include transaction records that are relevant for the member. The block chain network may be fully distributed across members of a block chain network, meaning that the block chain is distributed but only authorized members may read the details of a party's transactions. As used hereafter, a member of the block chain refers to an individual or entity that maintains local copies of the block chain. Additionally, as used hereafter, a party refers to an individual or entity that places transactions and is authorized to view a portion of the transaction records on the block chain. In various embodiments, a party is a member of the block chain, but a member of the block chain need not be a party. For example, a member of the block chain may be a regulator that oversees transactions placed by various parties but does not place transactions itself.

In various embodiments, the central service provider uses symmetric and asymmetric cryptography techniques to ensure private viewing of transaction records in a block. For each new block, the central service provider generates symmetric keys that are each specific to a party and that party's transactions. The central service provider encrypts transaction records of a party using the corresponding symmetric key and adds the encrypted transaction records to a block of transaction records. Additionally, the central service provider encrypts the symmetric keys using the public keys of one or more members of the block chain network that are authorized to access those transaction records. The symmetric key is further encrypted and included in a header of the block of transaction records.

The central service provider assembles the header with the encrypted block of transaction records and may distribute the assembled header and encrypted block to members of the block chain. Therefore, an authorized member can access details of a subset of transactions in the encrypted block by decrypting the header using an asymmetric key to obtain the symmetric key and by further decrypting the transaction records using the symmetric key. When new transactions are received, the central service provider repeats this process to generate encrypted transaction records to be written to the block chain that may be distributed to the members of the block chain network without losing privacy of the transactions.

The benefits of the implementation of the various embodiments described herein are several-fold. First, there is a single network across all members of the block chain network and hence, redundant resources for managing individual systems are removed. Second, security is achieved through cryptography and importantly, members of the network can only read the details of transactions to which they are entitled. Employing cryptography further establishes immutability of transaction records, thereby guarding against possible malicious acts. Third, data resiliency is improved as the encrypted transaction records are locally stored with the members, thereby reducing reliance on a central database.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
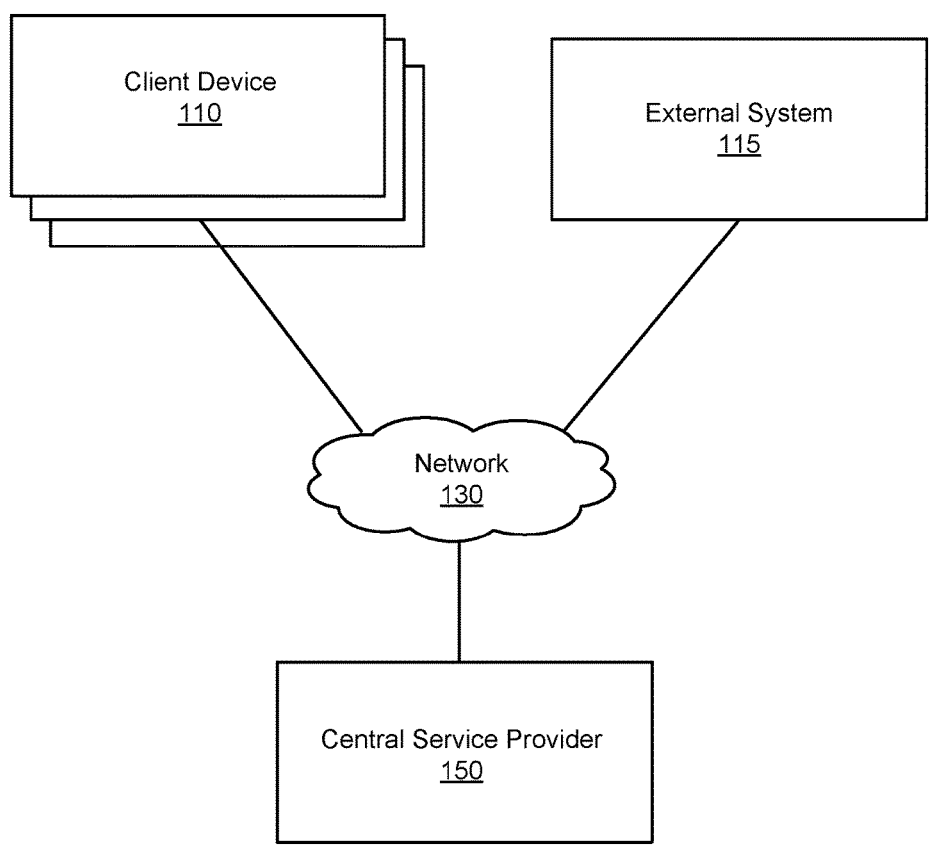
FIG. 1 depicts an overall system environment for generating and distributing encrypted blocks of transaction records, in accordance with an embodiment.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. For example, a letter after a reference numeral, such as "transaction record 440A," indicates that the text refers specifically to the element having that particular reference numeral. A reference numeral in the text without a following letter, such as "transaction record 440," refers to any or all of the elements in the figures bearing that reference numeral (e.g. "transaction record 440" in the text refers to reference numerals "transaction record 440A" and/or "transaction record 440B" in the figures).

Overall System Environment

FIG. 1 depicts an overall system environment for generating and distributing encrypted blocks of transaction records, in accordance with an embodiment. The system environment 100 can include one or more client devices 110, one or more external systems 115, and one or more central service providers 150 interconnected through a network 130. A central service provider 150 maintains and writes transaction records to a block chain managed by the central service provider 150 and provided to other members of the block chain. In some embodiments, only the central service provider can write to the block chain, while other members can view only parts of the block chain for which they are authorized. In various embodiments, a member of the block chain is assigned a public key and private key pair and can use the key pair to access and read certain transaction records in a block of transaction records.

The block chain can be distributed across members of the block chain network. For example, the blocks of the block chain are continuously downloaded and accessed by client devices 110 and external systems 115 of the system environment 100. Each block in the block chain includes a set of encrypted transaction records. In various embodiments, only the central service provider 150 has the ability to write blocks of transaction records to the block chain whereas the client devices 110 and external systems 115 only have access and read permissions.

Generally, the central service provider 150 generates a block of transaction records using a combination of symmetric and asymmetric cryptographic techniques. Details of a transaction may be encrypted using a symmetric key that is specific for a party. The symmetric key is further encrypted with an asymmetric key for each member that is authorized to view the transactions that were encrypted by the symmetric key. The central service provider 150 transmits the blocks of transaction records to the client devices 110 and/or external system 115. A block of transaction records may include all transaction records or may only include transaction records that a member is authorized to view. A client device 110 can only decrypt and view transaction records in the block that a member associated with the client device 110 is authorized to view. Therefore, this enables private viewing of only transaction records in the block that involve a specific party. In some embodiments, the external system 115 is a regulator that oversees all transactions performed by the central service provider 150 and therefore, is an authorized viewer for all transaction records in the block.

Network

The network 130 facilitates communications between the client device 110, external system 115, and central service provider 150. The network 130 may be any wired or wireless local area network (LAN) and/or wide area network (WAN), such as an intranet, an extranet, or the Internet. In various embodiments, the network 130 uses standard communication technologies and/or protocols. Examples of technologies used by the network 130 include Ethernet, 802.11, 3G, 4G, 802.16, or any other suitable communication technology. The network 130 may use wireless, wired, or a combination of wireless and wired communication technologies. Examples of protocols used by the network 130 include transmission control protocol/Internet protocol (TCP/IP), hypertext transport protocol (HTTP), simple mail transfer protocol (SMTP), file transfer protocol (TCP), or any other suitable communication protocol.

Client Device and External System

The client device 110 and/or external system 115 may be electronic devices such as a personal computer (PC), a desktop computer, a laptop computer, a notebook, a tablet PC executing an operating system, for example, a Microsoft Windows-compatible operating system (OS), Apple OS X, and/or a Linux distribution. In another embodiment, the client device 110 and/or external system 115 can be any device having computer functionality, such as a personal digital assistant (PDA), mobile telephone, smartphone, etc. In other embodiments, the client device 110 and/or external system 115 are embodied as a cloud server or rack server. In other words, the functions and algorithms performed by either the client device 110 or external system 115 can be distributed across multiple processors and/or electronic devices.

Each of the client device 110 and external system 115 may execute instructions (e.g., computer code) stored on a computer-readable storage medium. The client device 110 and external system may each include one or more executable applications, such as a web browser, to interact with services and/or content provided by the central service provider 150. In another scenario, the executable application may be a particular application designed by the central service provider 150 and locally installed on either the client device 110 or external system 115. As one particular scenario, a user of the client device 110 or external system 115 may register with the central service provider 150 using a user identifier and password in order to become a party or a member of the block chain. Although the embodiment depicted in FIG. 1 shows three client devices 110 and one external system 115, in other embodiments the environment 100 may include other numbers of client devices 110 and/or external systems 115.

Figure 2A:
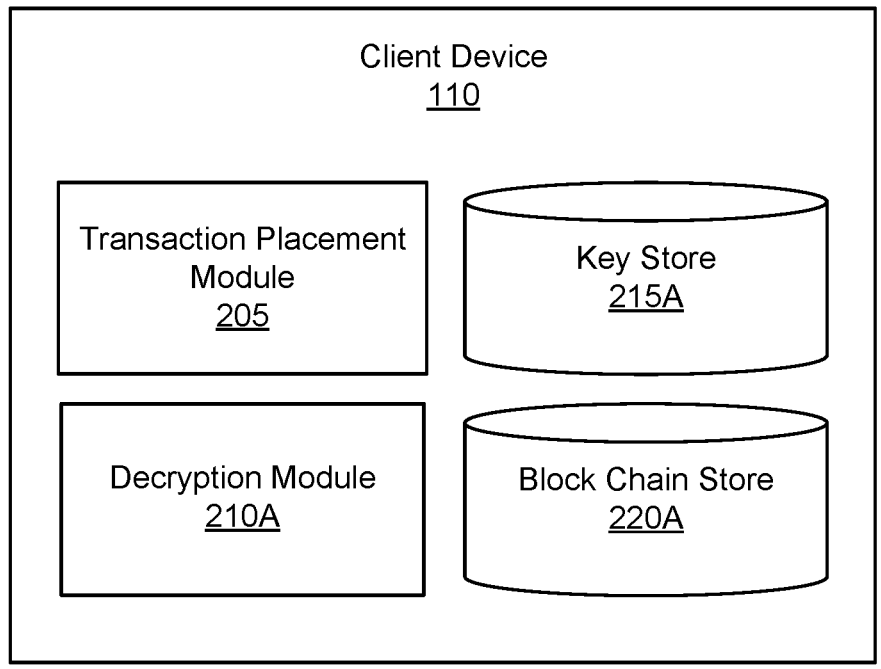
FIGS. 2A, 2B, and 2C depict example block diagrams of a client device, external system, and central service provider, respectively, in accordance with an embodiment.

Referring to the modules of the client device 110 as shown in FIG. 2A, the client device 110 includes a transaction placement module 205, a decryption module 210A, a key store 215A, and a block chain store 220A for performing these functions. In some embodiments, the client device 110 includes additional or fewer modules for performing the functions. As an example, the client device 110 may further include a user interface for receiving interactions specifying a transaction order and for displaying details of transactions decrypted from an encrypted block of transaction records.

Generally, a client device 110 is associated with a party who is also a member of the block chain. A client device 110 can be used by an individual to perform various functions such as place an order for a transaction that specifies a transfer of assets (i.e., performed by the transaction placement module 205), receive and store a block of the block chain (i.e., stored in block chain store 220A), or decrypt a block of transaction records (i.e., performed by decryption module 210A) such that a party can access and read the transaction records that pertain to the party. In various embodiments, the client device 110 requests block chain data from the central service provider 150 at pre-determined time intervals. Upon receiving the block chain data, the client device 110 can receive and store the block chain data such that the block chain network is distributed across the client devices 110 and the central service provider 150.

The transaction placement module 205 places a transaction specifying a transfer of an asset. For example, a transaction specifies an asset type and a quantity of the asset to be transferred. Examples of an asset may be cash (e.g., a fund wire), stock, bonds, securities (e.g., call option or put option), mutual funds, loans, deposits (e.g., certificate of deposits), bills (e.g., treasury bills), and the like. In some embodiments, the transaction placement module 205 places a transaction on behalf of the party that is associated with the client device 110. Therefore, in this scenario, the transaction can further specify one or more parties as well as a direction of transfer (e.g., transferring the asset to or from the party). In various embodiments, the transaction further specifies conditions for executing the transaction. For example, if the asset is a call or put option, the transaction further specifies an agreed-upon price at a specified date. The transaction placement module 205 can place the transaction by transmitting the transaction through the network 130 to the central service provider 150.

The client device 110 may also receive blocks of transaction records that can be locally stored in the client device 110 in the block chain store 220A. The client device 110 decrypts the encrypted transaction records in the block. For example, the client device 110 includes a decryption module 210A and a key store 215A from which the decryption module 210A can retrieve a key to be used for the decrypting process. Further details regarding the decryption module 210A is described below in regards to FIG. 7.

Figure 2B:
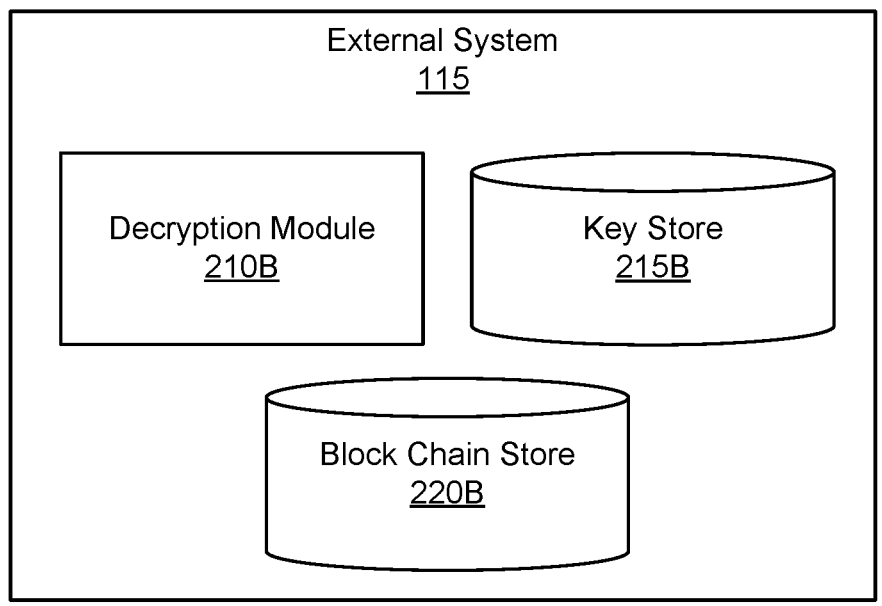

Referring to the modules of the external system 115 as shown in FIG. 2B, the external system 115 may include a decryption module 210B as well as a key store 215B and block chain store 220B for performing the processes described below. Generally, the external system 115 is a regulator that is authorized to view transaction records of other parties. As an example, the regulator may oversee the transactions that are executed by the central service provider 150. In various embodiments, a regulator may be able to see all transactions or view all transactions under their jurisdiction (e.g., transactions in a certain country, province, state, or district). The external system 115 may be a member of the block chain and therefore, can access and view the transaction records in a block of the block chain. The external system 115 is a member of the block chain but is not a party that transacts assets with other parties.

The external system 115 (e.g., a regulator) receives a block of transaction records from the central service provider 150 and can locally store the block in the block chain store 220B. The external system 115 further decrypts the block to obtain all transaction records in the block. In various embodiments, such as the embodiment shown in FIG. 2B, the external system 115 includes a decryption module 210B that performs the decryption process on the block of transaction records to obtain the encrypted transaction records. Therefore, the external system 115 can appropriately oversee all transactions executed by the central service provider 150. Further details regarding the decryption module 210B is also described below in regards to FIG. 7.

Central Service Provider

The central service provider 150 is one or more electronic devices associated with an institution such as a bank, asset management firm, financial services corporation, or central clearing agent. In some embodiments, the central service provider 150 can be embodied as a cloud server or rack server. In other words, the functions and algorithms performed by the central service provider 150 can be distributed across multiple processors and/or electronic devices. In some embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

The central service provider 150 receives and executes requests for transactions for its customers. Generally, the central service provider 150 maintains a block chain and writes a block that includes encrypted transaction records to the block chain. The central service provider 150 generates a block such that when the block is transmitted to client devices 110 and external systems 115, the client devices 110 and external systems 115 can only decrypt and read transaction records in the block that they are authorized to view. In various embodiments, the central service provider 150 uses a combination of symmetric encryption (e.g., using a symmetric key) and asymmetric encryption (e.g., using a public/private key pair) to generate the block.

Figure 2C:
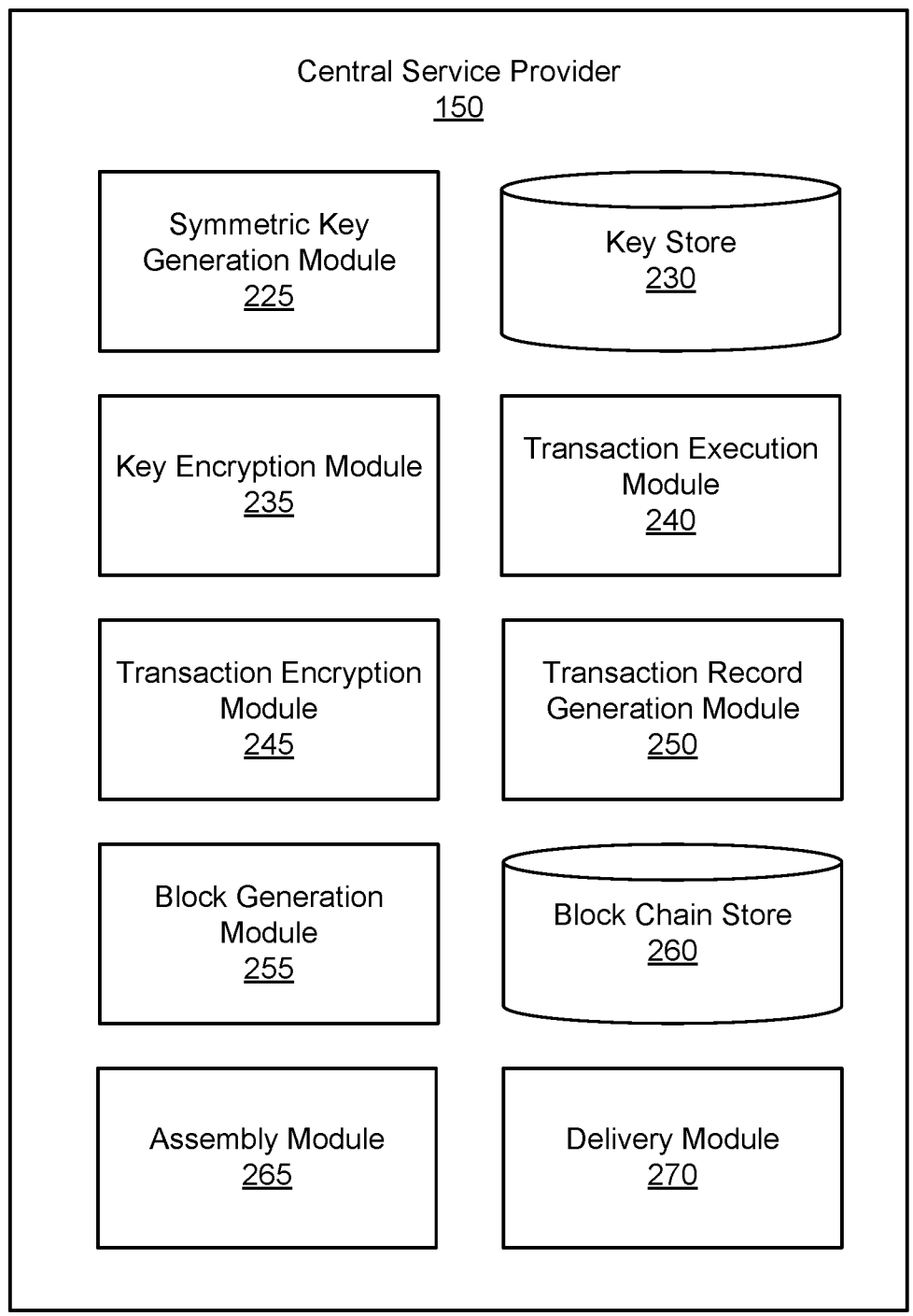

Referring now to FIG. 2C, it depicts an example block diagram of a central service provider 150, in accordance with an embodiment. In this embodiment, the central service provider 150 includes a symmetric key generation module 225, a key encryption module 235, a transaction execution module 240, a transaction encryption module 245, a transaction record generation module 250, a block generation module 255, an assembly module 265, and a delivery module 270. The operations performed by each module of the central service provider 150 are described below.

Generating Encrypted Symmetric Keys

Figure 3:
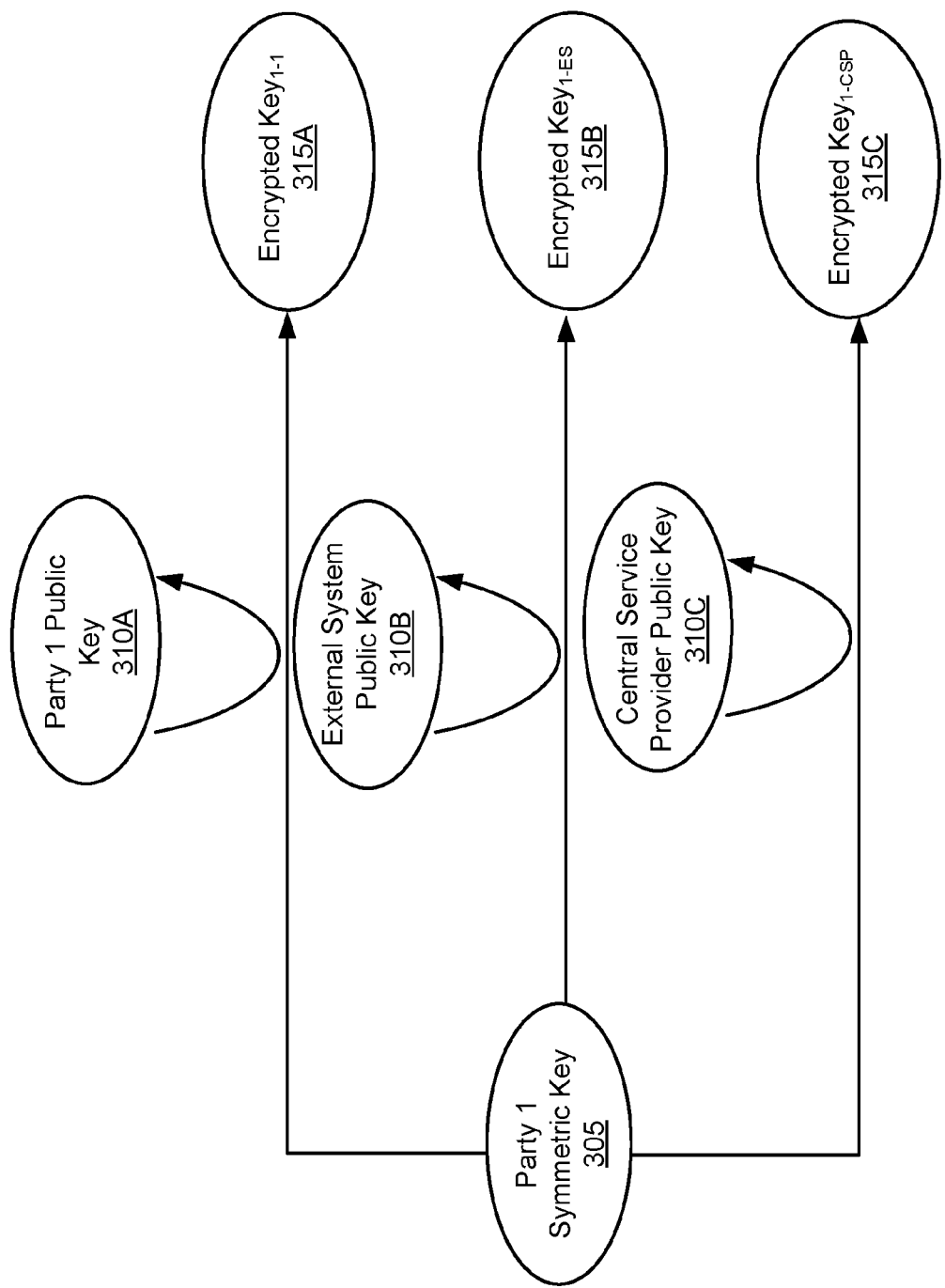
FIG. 3 depicts an example process of generating encrypted symmetric keys, in accordance with an embodiment.

FIG. 3 depicts an example process of generating encrypted symmetric keys, in accordance with an embodiment. Generally, the symmetric key generation module 225 generates a symmetric key and the key encryption module 215 encrypts the symmetric key using different public keys in order to obtain different encrypted symmetric keys that all derive from the same symmetric key.

In one embodiment, the symmetric key generation module 225 generates a symmetric key for each party. In some embodiments, a single party may include various sub-parties that are distinct from one another. Therefore, a single party may have multiple symmetric keys (e.g., one symmetric key for each sub-party). As an example, the symmetric key generated by the symmetric key generation module 225 is a random advanced encryption standard (AES) 128-bit, 192-bit, or 256-bit symmetric key. As another example, the symmetric key may use different standards such as the data encryption standard (DES) or triple data encryption standard (TDES).

In various embodiments, the symmetric key generation module 225 generates one symmetric key for each party that places transactions or views transaction records of the block chain. For example, there may be N total parties interacting with the block chain. Therefore, the symmetric key generation module 225 generates N total symmetric keys.

In various embodiments, the symmetric key generation module 225 generates one or more symmetric keys at the beginning of each new time period. In some embodiments, a time period may be between 1 second and 30 minutes. In some embodiments, the time period corresponds to a block of transaction records. In other words, the symmetric key generation module 225 generates new symmetric keys for each new block of transaction records that are to be stored on the block chain. This technique enables each new block of transaction records to be encrypted using new symmetric keys, thereby increasing data security.

Once generated, the symmetric key generation module 225 provides the symmetric keys to the key encryption module 235. The key encryption module 235 encrypts each of the generated symmetric keys for each party authorized to view transaction records that are encrypted by that symmetric key. Each symmetric key is encrypted using an asymmetric key of the authorized party, such as a public key. In various embodiments, the public key of a party is previously provided by the party and stored in the key store 230.

For a particular transaction record, the transacting party, an external system 115 (e.g., a regulator) and the central service provider 150 may be authorized to view the transaction record. Therefore, the key encryption module 235 generates a first encrypted symmetric key for the authorized party, a second encrypted symmetric key for the external system 115 (e.g., regulator), and a third encrypted symmetric key for the central service provider 150.

Referring to the example of the generation of multiple encrypted symmetric keys in FIG. 3, the key encryption module 235 receives party 1 symmetric key 305 from the symmetric key generation module 225. Although not depicted, the key encryption module 235 may also receive symmetric keys corresponding to additional parties (e.g., party 2 symmetric key, party 3 symmetric key, . . . party N symmetric key) and can perform the steps described below for each of the additional parties. The key encryption module 235 identifies that the symmetric key 305 corresponds to party 1. As one example, the key encryption module 235 can receive an indication from the key generation module 225 that the symmetric key corresponds to party 1. Here, members authorized to view transaction records of party 1 can include party 1, an external system 115 (e.g., regulator) and the central service provider 150. Therefore, the public keys 310 for each of the authorized members are retrieved from key store 230. These public keys may be provided to and stored by the central service provider 150 at a previous time.

The key encryption module 235 encrypts party 1 symmetric key 305 using each of the public keys 310 to obtain a set of encrypted symmetric keys 315. Specifically, the key encryption module 235 generates an encrypted $key_{1-1}$ 315A, an encrypted $key_{1-ES}$ 315B, and an encrypted $key_{1-CSP}$ 315C. To clarify the notation, encrypted $key_{1-1}$ 315A refers to an encrypted symmetric key derived from a party 1 symmetric key 305 that was encrypted using a party 1 public key 310A. Encrypted $key_{1-ES}$ 315B refers to an encrypted symmetric key derived from a party 1 symmetric key 305 that was encrypted using the external system public key 310B. Encrypted $key_{1-CSP}$ 315C refers to an encrypted symmetric key derived from a party 1 symmetric key 305 that was encrypted using the central service provider public key 310C.

In various embodiments, the key encryption module 235 stores the encrypted symmetric keys in the key store 230. The encrypted symmetric keys may be held in the key store 230 for a time period that corresponds to a block of transaction records. In some embodiments, once the time period for a block closes (e.g., a new block begins), the encrypted symmetric keys for the prior block are discarded from the key store 230.

Generating a Block of Transaction Records

Returning to FIG. 2, transaction execution module 240 receives one or more transactions and writes the details of the transactions to the block chain. The transactions can be received from a client device 110 as requests for the transactions. Generally, the transaction execution module 240 receives a first set of transactions within a time period such that the details of the first set of transactions are written to a first block of the block chain. The transaction execution module 240 can further receive a second set of transactions in a next time period such that details of the second set of transactions are written to a next, adjacent block in the block chain. The transaction execution module 240 continues to repeat this process for subsequent sets of transactions received in subsequent time periods to build the block chain. In various embodiments, the time period for which a block of transaction records is generated can vary. For example, the time period can be a static duration of time, such as 10 minutes. In various embodiments, a block of transaction records contains a threshold number of transaction records. Therefore a subsequent block of transaction records is started when a threshold number of transaction records is exceeded. In some embodiments, a block of transaction records contains a threshold amount of asset value (e.g., $1 billion). In various embodiments, a block of transaction records includes a combination of a threshold amount of transaction records, threshold amount of asset value, and/or threshold amount of time.

In each time period, the transaction execution module 240 organizes the received transactions for that time period. For example, the transaction execution module 240 can assign an order to the transactions such that the corresponding transaction records are written in a block to the block chain in their assigned order. In some embodiments, the transaction execution module 240 assigns timestamps to the received transactions in the time period and orders the received transactions based on their assigned timestamp. In some embodiments, the transaction execution module 240 assigns the same timestamp to the received transactions in the time period and then assigns an arbitrary order.

The transaction execution module 240 may also extract relevant information from each transaction. For example, the transaction execution module 240 parses the information corresponding to the transaction (e.g., asset type, a quantity of the asset, party that provided the transaction, one or more parties involved in the transaction, conditions for the transaction to be executed). In some embodiments, the transaction execution module 240 uses the parsed information to execute the transaction. Given a particular asset type in a transaction, the transaction execution module 240 may update a ledger specific for the asset type in order to effect the transaction. In other embodiments, the transaction execution module 240 provides the parsed information to a different system such that the different system can execute the transaction.

Figure 4A:
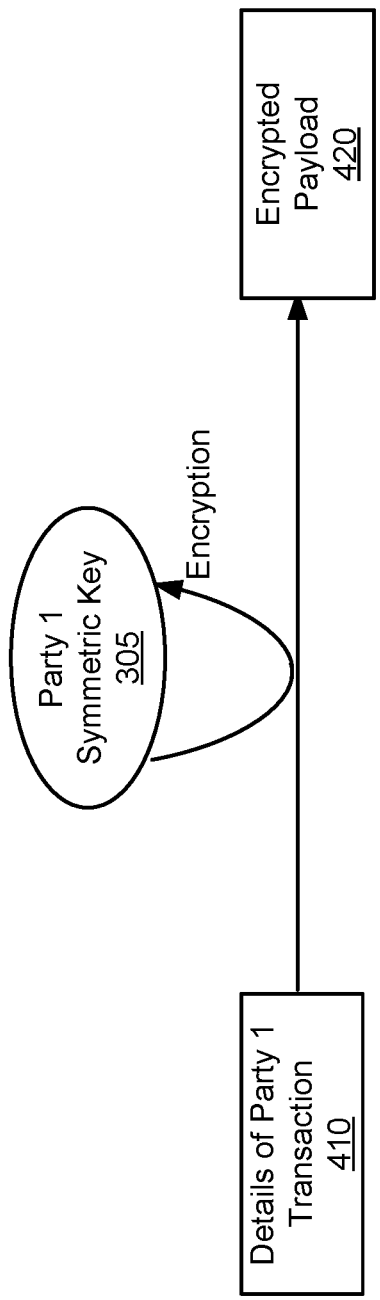
FIG. 4A depicts an example encryption of a received transaction, in accordance with an embodiment.

Transaction encryption module 245 encrypts details of each of the executed transactions into an encrypted payload that is written within a transaction record in a block. Generally, for a particular transaction, the transaction encryption module 245 retrieves the extracted information from the transaction execution module 240 that identifies the party that sent the transaction and retrieves the symmetric key corresponding to the identified party in order to encrypt the details of a transaction. Reference is now made to FIG. 4A, which depicts an example encryption of details of a received transaction, in accordance with an embodiment. Here, a transaction for party 1 is received. The transaction encryption module 245 identifies information specifying that the transaction originates from a party 1 and therefore, retrieves the party 1 symmetric key 305. The transaction encryption module 245 encrypts details of the party 1 transaction 410 using the party 1 symmetric key 305 to obtain the encrypted payload 420. In various embodiments, the transaction encryption module 245 performs a symmetric encryption process using one of AES, DES, or TDES. The party 1 symmetric key 305 used to encrypt the details of party 1 transaction 410 can similarly be used to decrypt the encrypted payload 420. The transaction encryption module 245 provides each encrypted payload 420 to the transaction record generation module 250 for generation of the transaction records.

Figure 4B:
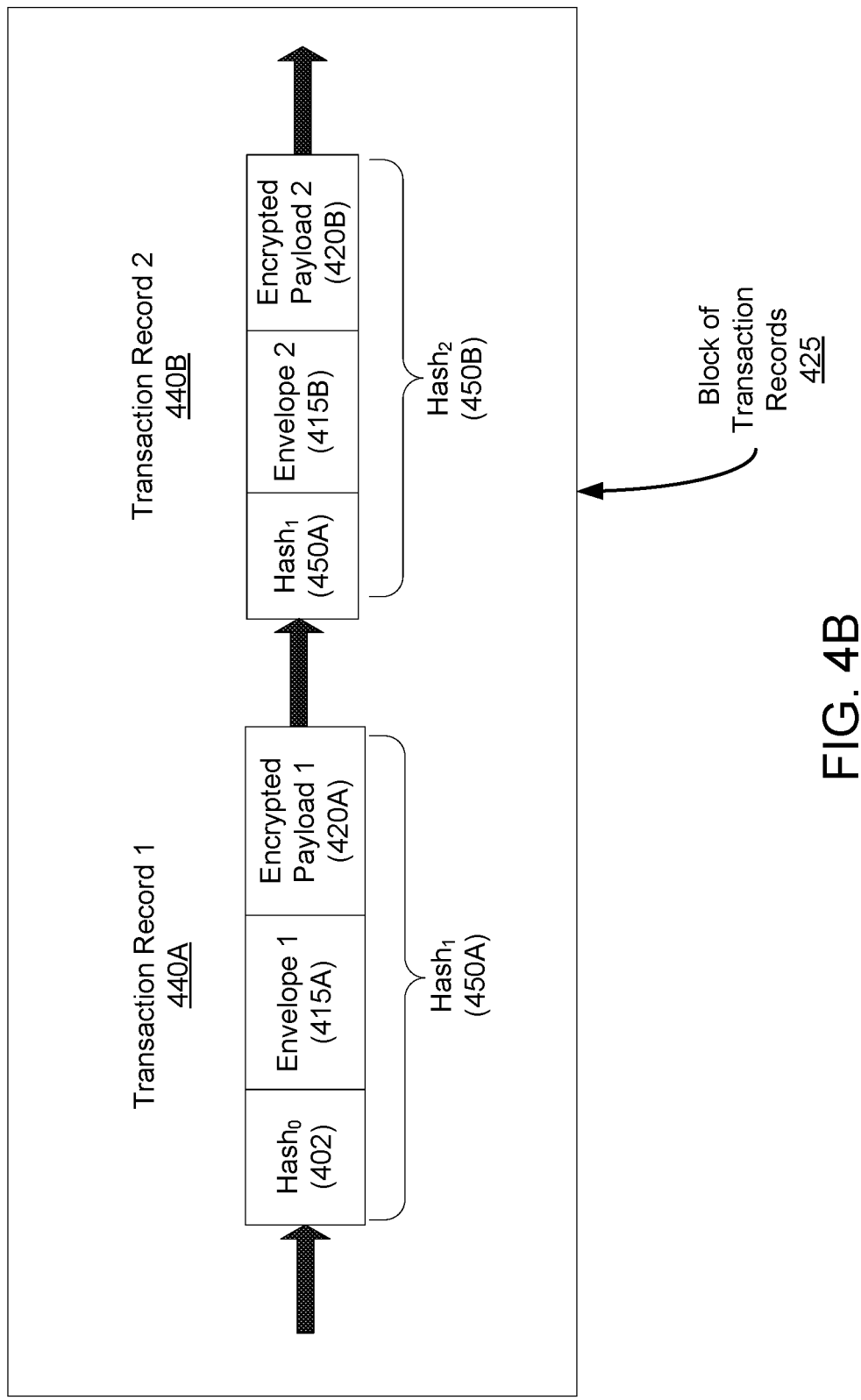
FIG. 4B depicts example transaction records within a block of transaction records generated by the central service provider, in accordance with an embodiment.

The transaction record generation module 250 generates transaction records that each incorporates an encrypted payload 420. Reference is now made to FIG. 4B, which depicts example transaction records 440 within a block of transaction records 425, in accordance with an embodiment. In the embodiment shown in FIG. 4B, a transaction record 440 can include various components such as a hash value (402 or 450A), an envelope 415, and an encrypted payload 420 received from the transaction encryption module 245. Other embodiments of a transaction record 440 can include additional or fewer components.

The hash value (e.g., 402 or 450A) corresponds to a hash of a prior transaction record. In other words, the hash value serves as a transaction identifier, specifically, a transaction identifier of the previous transaction record. For example, referring to FIG. 4B, hash$_1$ (450A) included as a part of transaction record 2 (440B) is the hash value representing transaction record 1 (440A). Similarly, hash$_0$ (402) of transaction record 1 (440A) is the hash value of the immediately preceding transaction record. In various embodiments, the hash (402 or 450A) of a transaction record 440 is generated using one of a message digest algorithm 5 (MD5), a secure hash algorithm (SHA) algorithm (e.g., SHA-0, SHA-1, SHA-2, or SHA-3), BLAKE, or other hash functions of the like. As a particular example, the hash value (402 or 450A) of a transaction record 440 is a SHA256 hash.

In various embodiments, the order of the transaction records 440 is based on the assigned order of the received transactions, as described above in relation to the transaction execution module 240. Therefore, the inclusion of a hash value (402 or 450A) in a transaction record 440 that is the hash value representing a previous transaction record 440 establishes data immutability. In other words, if a single transaction record 440 is altered, then the chain of transaction records is invalidated because the hash values no longer align.

Each envelope 415 includes various attributes associated with the corresponding encrypted payload 420. For example, the envelope 415 can include a digital signature of the central service provider 150. This acts as a cryptographic guarantee that details of the transaction were not altered and were successfully written in a block to the block chain. As another example, the envelope 415 can include information (e.g., a digital signature), signifying that the corresponding payload 420 in the transaction record 440 was encrypted using the symmetric key. This ensures that a client device 110 or external system 115 that accesses the transaction record 440 with the envelope 415 can readily identify that the encrypted payload 420 was encrypted using the particular symmetric key such that the encrypted payload 420 can be appropriately decrypted using that same symmetric key. As another example, the envelope 415 can further include information such as an identifier of the block that the transaction record 440 is included within and/or an identifier of the position of the transaction record 440 within the block.

The block generation module 255 generates a block of transaction records 425 that includes the multiple transaction records 440 that were generated by the transaction record generation module 250. As stated above, the multiple transaction records 440 are immutably linked by the hash value in each transaction record 440. In some embodiments, the block of transaction records 425 is written as a block onto the block chain. Each block of the block chain contains a reference (e.g., a hash value) of the prior block of the block chain, thereby ensuring that the blocks are also immutable in the block chain. Each block of transaction records is additionally provided to the assembly module 265.

Figure 4C:
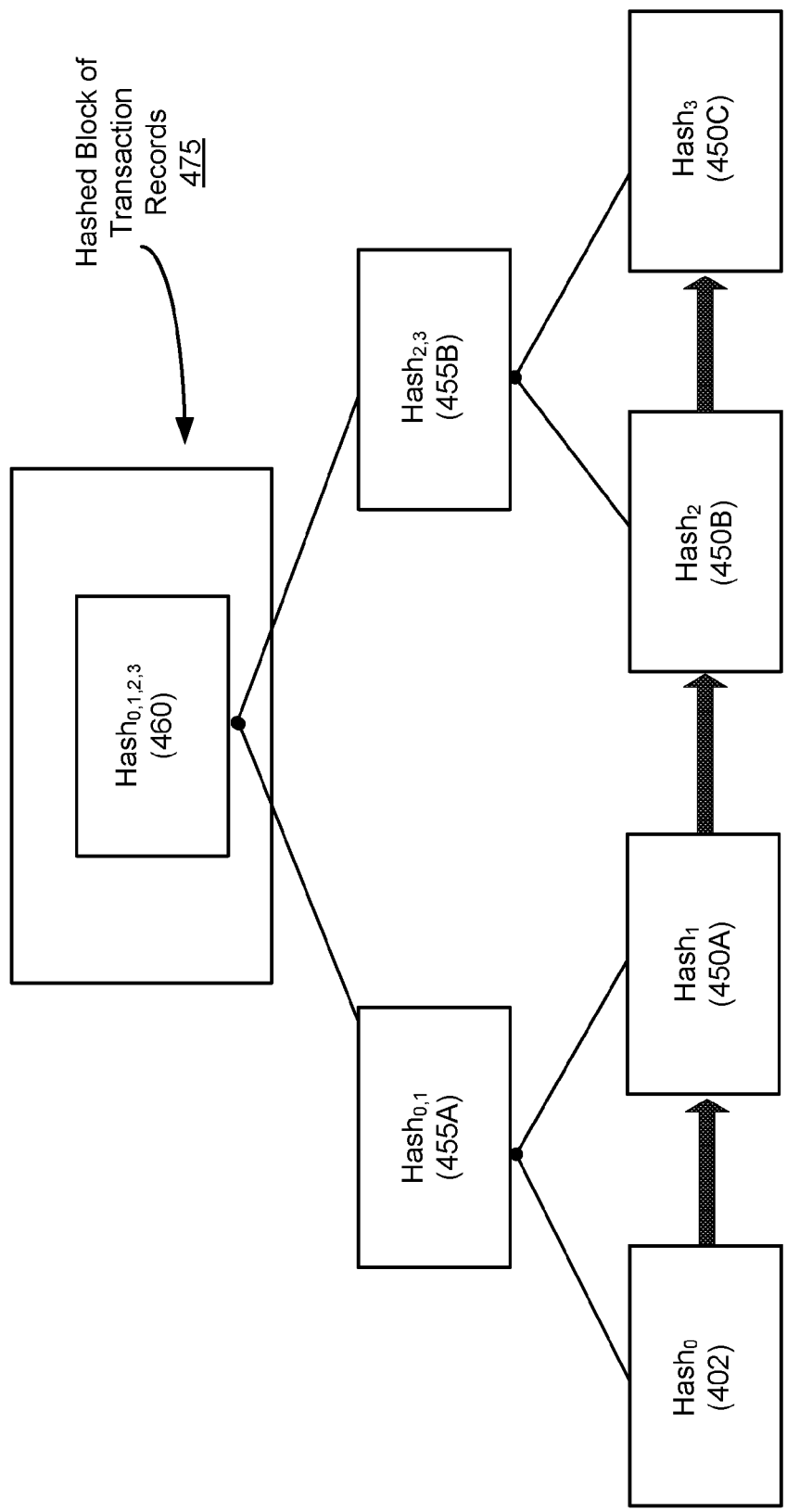
FIG. 4C illustrates an example hashing strategy for generating a hashed block of transaction records, in accordance with an embodiment.

In various embodiments, the block of transaction records 425 can be further processed to generate a hashed block of transaction records to reduce computational resources that are needed to verify transaction records across multiple members of the block chain. Reference is now made to FIG. 4C, which illustrates an example hashing strategy for generating a hashed block of transaction records 475, in accordance with an embodiment. Specifically, the block of transaction records 425 can be hashed using a hash tree (e.g., a Merkle tree) to reduce file sizes to enable more efficient data verification.

As depicted in the embodiment shown in FIG. 4C, the block generation module 255 can apply a hash algorithm to pairs of transaction records 440, each of which is represented as one of hash$_0$ 402, hash$_1$ 450A, hash$_2$ 450B, or hash$_3$ 450C. Specifically, hash$_0$ 402 and hash$_1$ 450A are combined and hashed using any of the aforementioned hashing algorithms (e.g., MD5, SHA-0, SHA-1, SHA-2, SHA-3, BLAKE, and the like) to generate hash$_{0,1}$ 455A. Similarly, hash$_2$ 450B and hash$_3$ 450C are combined and hashed to generate hash$_{2,3}$ 455B. Then, hash$_{0,1}$ 455A and hash$_{2,3}$ 455B are combined and hashed to generate a root of the hash tree, represented as hash$_{0,1,2,3}$ 460. As depicted in FIG. 4C, the root of the hash tree represents a hashed block of transaction records 475 for the block.

In various embodiments, the block generation module 255 stores the hashed block of transaction records 475 in the block chain store 260. Storing the hashed block of transaction records 475 can be more efficient for data verification purposes. For example, if a client device 110 is interested in verifying a block of transaction records, the hashed block of transaction records 475 can be transmitted to the client device 110 for verification, the process of which requires significantly less memory and storage space in comparison to transmitting the full block of transaction records.

Generating and Delivering an Assembled Header and Block

Figure 5:
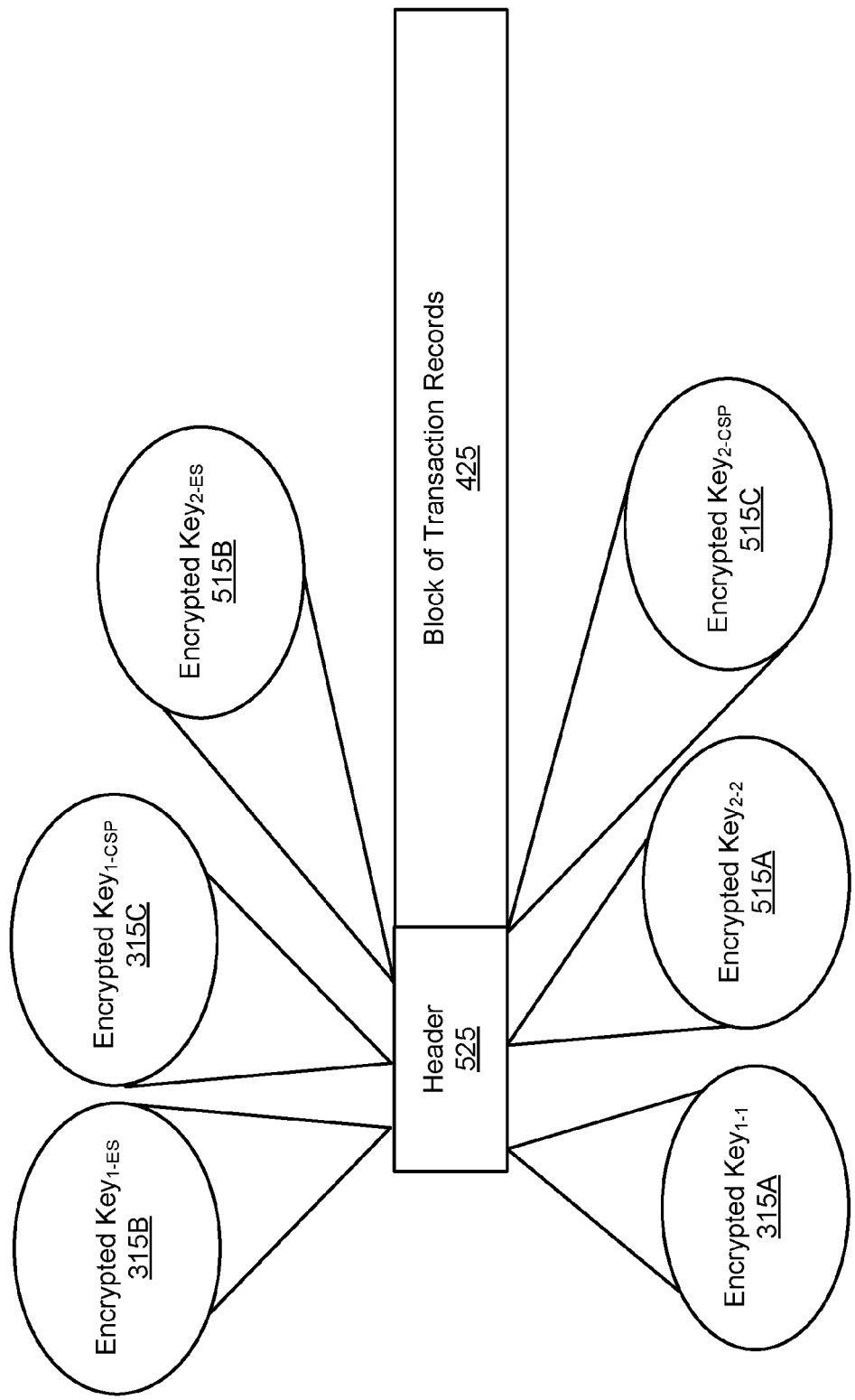
FIG. 5 depicts an example header and block of transaction records, in accordance with an embodiment.

The assembly module 265 assembles a header that includes encrypted symmetric keys with an encrypted block of transaction records such as the block of transaction records 425 (see FIG. 4B). Reference is now made to FIG. 5, which is an example header 525 and block of transaction records 425, in accordance with an embodiment.

The assembly module 265 generates the header 525 which includes one or more sets of encrypted symmetric keys. The assembly module 265 retrieves each set of encrypted symmetric keys from the key store 230. Generally, the header 525 includes multiple sets of encrypted symmetric keys, each set derived from a common symmetric key that was generated for a party that is a member of the block chain. For example, if there are N total parties that are members of the block chain, then the assembly module 265 generates a header 525 that includes N different sets of encrypted symmetric keys.

As shown in FIG. 5, the header 525 can include a first set of encrypted symmetric keys derived from a party 1 symmetric key 305 including the encrypted $key_{1-1}$ 315A, encrypted $key_{1-ES}$ 315B, and encrypted $key_{1-CSP}$ 315C. Additionally, the header 525 includes additional sets of symmetric keys, each set corresponding to an additional party (e.g., party 2) that is a member of the block chain. Specifically, the header 525 depicted in FIG. 5 also includes a second set of encrypted symmetric keys including the encrypted $key_{2-2}$ 515A, encrypted $key_{2-ES}$ 515B, and encrypted $key_{2-CSP}$ 515C.

In various embodiments, the header 525 further includes a signature for each encrypted symmetric key. Including signatures in the header 525 enables the client device 110 and external system 115 to readily identify which encrypted symmetric key can be appropriately decrypted by the private key associated with the party. For example, each encrypted symmetric key can be signed by the public key that was used to encrypt and generate the encrypted symmetric key. Specifically, the encrypted $key_{1-1}$ 315A is signed by the party 1 public key 310A (see FIG. 3) that was used to encrypt the party 1 symmetric key to generate the encrypted $key_{1-1}$ 315A. Similarly, the encrypted $key_{1-ES}$ 315B and the encrypted $key_{1-CSP}$ 315C are signed by the external system public key 310B and the central service provider public key 310C, respectively. The encrypted symmetric keys in a second set corresponding to party 2 (e.g., 515A, 515B, and 515C) are similarly be signed by their respective public keys that were used to encrypt the symmetric key.

The assembly module 265 assembles the header 525 with the block of transaction records 425. Although FIG. 5 depicts that the header 525 component precedes the block of transaction records 425, in other embodiments, the header 525 may be differently positioned (e.g., appended to the block of transaction records 425) as long as the header 525 can be appropriately located when decoding the assembled header 525 and block 425.

The delivery module 270 transmits the assembled header 525 and block 425 to one or more client devices and/or one or more external systems 115 of the system environment. In other words, the delivery module 270 distributes transaction records in the block, thereby ensuring that the block chain is a distributed block chain. A client device 110 or external system 115 that receives the assembled header and encrypted block of transaction records can only decrypt and view transaction records in the encrypted block that they are authorized to view.

In various embodiments, the delivery module 270 transmits the assembled header 525 and block 425 at fixed time intervals. In various embodiments, the delivery module 270 transmits the assembled header 525 and block 425 after a threshold number of transaction records are included in the encrypted block of transaction records. In various embodiments, the delivery module 270 transmits the assembled header 525 and block 425 upon receiving a pull request from a client device 110 or external system 115.

Process for Generating an Assembled Header and Block

Figure 6:
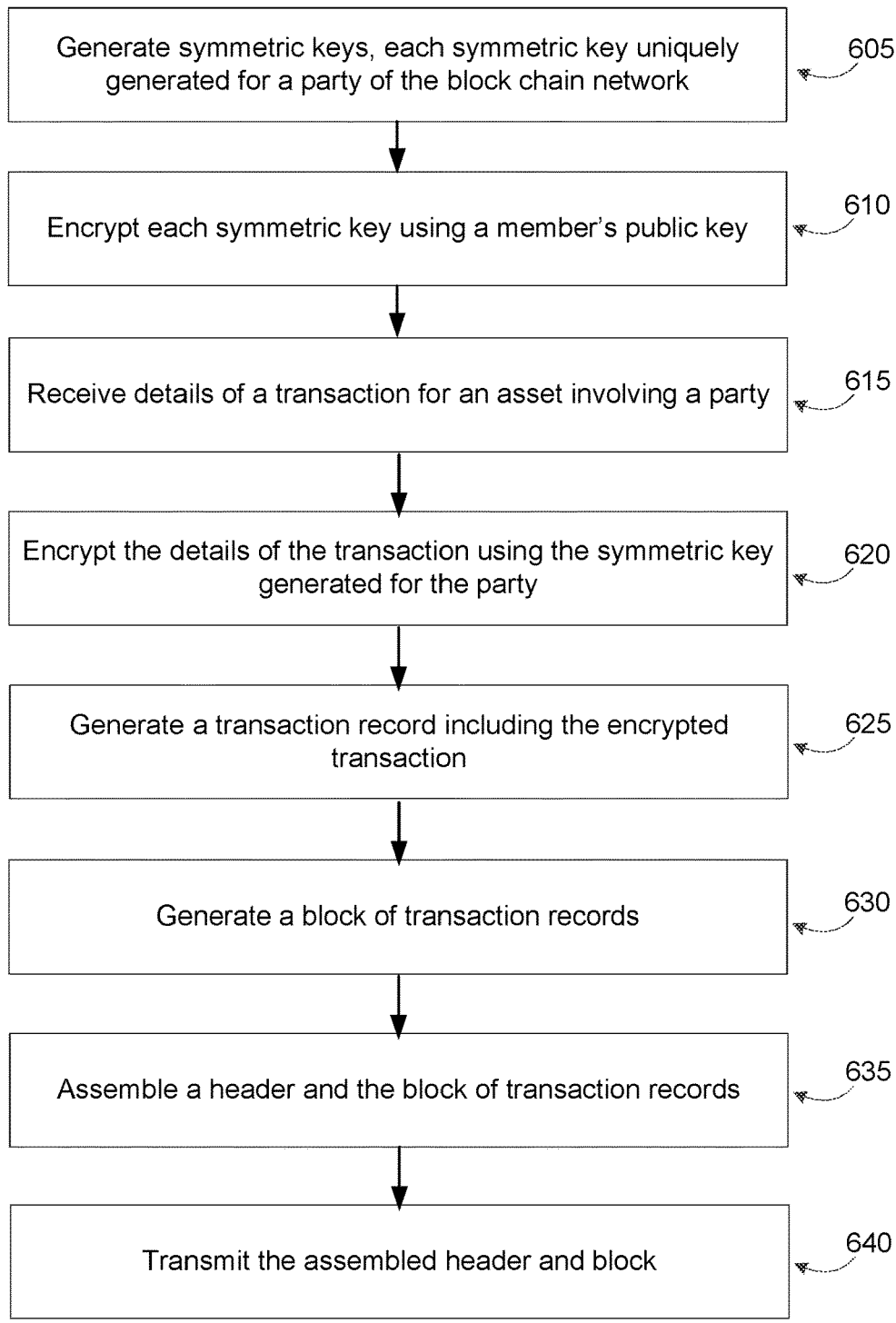
FIG. 6 is an overall flow diagram process for generating and delivering a header and block of transaction records by a central service provider, in accordance with an embodiment.

FIG. 6 is an overall flow diagram process for generating and delivering the header 525 and block of transaction records 425 by a central service provider 150, in accordance with an embodiment. Specifically, the central service provider 150 generates 605 a unique symmetric key for each party that is a member of the block chain. For each generated symmetric key, the central service provider 150 encrypts 610 the symmetric key using a public key assigned to the party. More generally put, encrypting the symmetric key using a public key serves as the asymmetric encryption procedure. In various embodiments, the central service provider 150 further encrypts the symmetric key using public keys assigned to other entities, such as the external system 115 and the central service provider 150.

The central service provider 150 receives 615 one or more transactions for an asset. As an example, the transaction may be received from a client device 110 that is acting on behalf of the party. For each transaction, the central service provider 150 identifies the party in the transaction and encrypts 620 the details of the transaction using the symmetric key that was generated for the party. Here, encrypting the details of the transaction serves as the symmetric encryption procedure.

The central service provider 150 generates 625 a transaction record for each transaction. The transaction record includes the encrypted payload for the transaction. Additionally, the transaction record includes various additional information such as an envelope of visible attributes associated with the encrypted transaction and a hash of a prior transaction record. The central service provider 150 generates 630 a block of the transaction records 425 that are immutably linked given the hashes in each transaction record. Given the block of transaction records, the central service provider 150 assembles 635 a header 525 as well as the block of transaction records 425. The header 525 includes an encrypted symmetric key that was encrypted using the public key of the party, as described above. Additionally, the header 525 can include encrypted symmetric keys corresponding to the central service provider 150, external system 115 (e.g., a regulator), and additional parties that are members of the block chain. The central service provider 150 transmits 640 the assembled header 525 and block 425 to one or more client devices 110 and external system 115 for private viewing.

Process for Decrypting an Assembled Header and Block

Referring again to FIG. 2A and FIG. 2B, the decryption module 210A and 210B of the client device 110 and external system 115, respectively, decrypt the received block of transaction records 425 provided by the central service provider 150 using the received header 525. In various embodiments, the central service provider 150 may also have a decryption module (not shown) that performs the methods of the decryption module 210B of the external system 115. Generally, each decryption module 210 decrypts the block of transaction records 425 in order to read the transaction records that the associated party is authorized to view. As an example, the decryption module 210A of the client device 110 is only authorized to decrypt and read transaction records that were originally requested by a party associated with the client device 110. As another example, the decryption module 210B of the external system 115 is authorized to decrypt and read all transaction records in the block of transaction records 425. In various embodiments, each decryption module 210 is able to decrypt transaction records that it is authorized to read using a combination of symmetric and asymmetric cryptography techniques.

Figure 7:
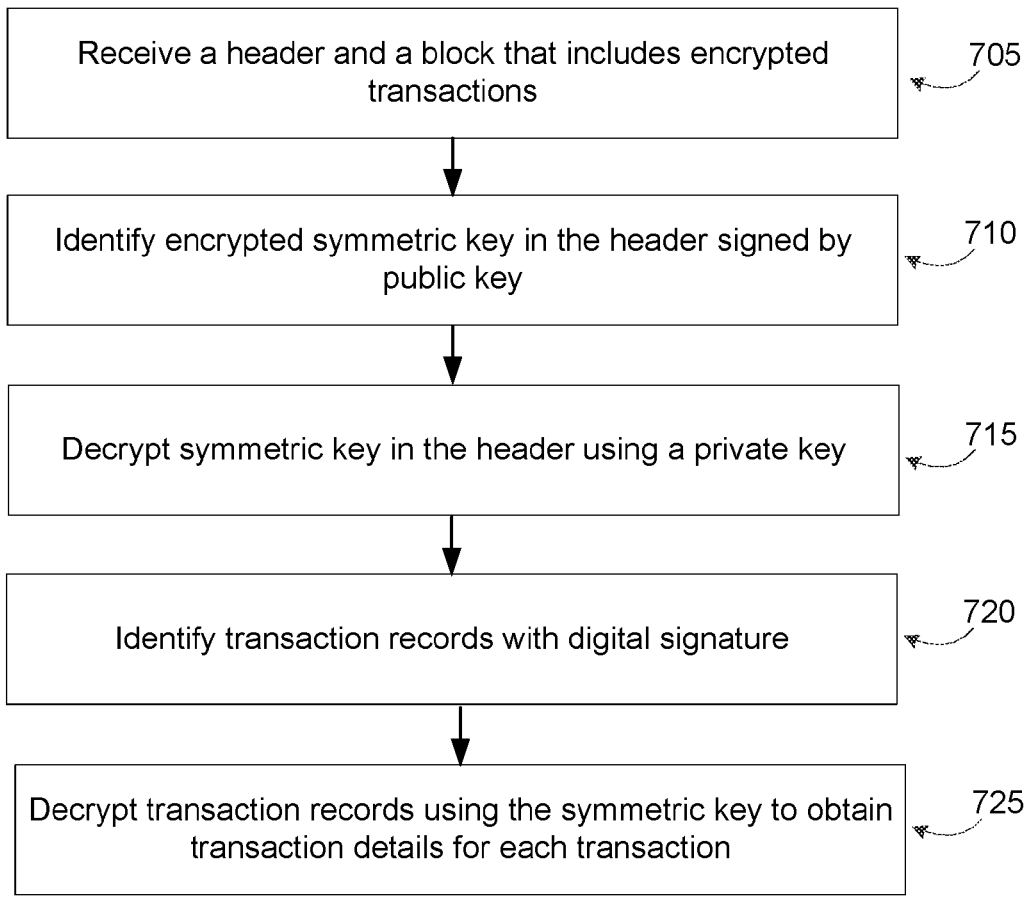
FIG. 7 depicts an overall flow process for decrypting the block of transaction records performed by a decryption module, in accordance with an embodiment.

Reference is now made to FIG. 7, which depicts an overall flow process for decrypting the block of transaction records 425 performed by a decryption module 210, in accordance with an embodiment. The decryption module 210 receives 705 the assembled header 525 and block 425 that includes multiple encrypted transaction records. The decryption module 210 performs a first decryption using asymmetric cryptographic techniques on the header 525. For example, decryption module 210A of the client device 110 identifies 710 an encrypted symmetric key in the header 525 that is signed by a corresponding public key. The corresponding public key may be previously assigned to the party associated with the client device 110 (i.e., the public key corresponding to the retrieved private key assigned to the party). The decryption module 210A retrieves a private key and decrypts 715 the symmetric key in the header 525 using the retrieved private key.

Referring to the decryption module 210B of the external system 115, it may identify multiple encrypted symmetric keys in the header 525 that are signed by the public key of the external system 115. The header 525 includes encrypted symmetric keys that are signed by the public key of the external system 115 that correspond to the parties that are members of the block chain. For example, as shown in FIG. 5, header 525 includes two encrypted symmetric keys signed by the public key of the external system 115 (e.g., encrypted $key_{1-ES}$ 315B and encrypted $key_{2-ES}$ 515B). Therefore, having identified the appropriately signed encrypted symmetric key, the decryption module 210 decrypts the header 525 to obtain the multiple symmetric keys.

The decryption module 210 performs a second decryption process using symmetric cryptography techniques. Having obtained the one or more symmetric keys, the decryption module 210 identifies 720 specific transaction records based on signatures that are included in the envelope of the transaction record. For example, each envelope includes a signature of the symmetric key that was used to encrypt the corresponding payload. Therefore, for each symmetric key the decryption module 210 has obtained, the decryption module 210 identifies the transaction records that include an encrypted payload that was encrypted using the symmetric key. Using the appropriate symmetric key, the decryption module 210 decrypts 725 the transaction records to obtain transaction details for each transaction.

Altogether, given that the decryption module 210A of the client device 110 only obtains a single symmetric key, it is only able to read transaction records of a subset of transaction records in the block of transaction records 425. In various embodiments, the subset of transaction records correspond to transactions that involve the party associated with the client device 110, thereby ensuring that other transaction records remain private.

Alternatively, given that the decryption module 210B of the external system 115 obtains N symmetric keys for the N parties, it can read transaction details of all transaction records in the block of transaction records 425. In various embodiments, each of the N symmetric key decrypts a subset of the transaction records in the block of transaction records 425. In particular, a subset of transaction records decrypted by a first symmetric key is unique in comparison to a different subset of transaction records decrypted by a different symmetric key. Altogether, accumulating all subsets of transaction records decrypted by the N symmetric keys yields all transaction records in the block of transaction records 425. Therefore, if the external system 115 is a regulatory body, then the external system 115 can read all transaction records that have been executed and written in the block.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   generating, by a symmetric key generation module of a central service provider, a first symmetric key for a first party and a second symmetric key for a second party;
   encrypting the first symmetric key using a public key assigned to the first party and the second symmetric key using a public key assigned to the second party;
   generating a header comprising the encrypted first symmetric key and the encrypted second symmetric key;
   receiving details for each of a plurality of transactions, a first subset of the plurality of transactions involving the first party and a second subset of the plurality of transactions involving the second party;
   encrypting details of each of the transactions in the first subset using the first symmetric key generated for the first party;
   encrypting details of each of the transactions in the second subset using the second symmetric key generated for the second party;
   generating a block of transaction records for a time period corresponding to the received transactions, the block of transaction records comprising the encrypted details of transactions in the first subset and the encrypted details of transactions in the second subset; and
   transmitting the header and the block of transaction records to a client device of the first party, the client device of the first party adapted to use the transmitted header to decrypt the encrypted details of the first subset of the plurality of transactions involving the first party in the block of transaction records and unable to use the transmitted header to decrypt the encrypted details of the second subset of the plurality of transactions involving the second party.

2. The method of claim 1, further comprising transmitting the header and the block of transaction records to a client device of the second party, the client device of the second party adapted to use the transmitted header to decrypt the encrypted details of the second subset of the plurality of transactions involving the second party in the block of transaction records and unable to use the transmitted header to decrypt the encrypted details of the first subset of the plurality of transactions involving the first party.

3. The method of claim 1, wherein the header further comprises:
   an encrypted symmetric key for an external system generated by encrypting the first symmetric key for the first party using a public key of the external system.

4. The method of claim 3, further comprising transmitting the header and the block of transaction records to the external system.

5. The method of claim 1, wherein each transaction record in the block comprises an envelope comprising a digital signature.

6. The method of claim 1, wherein each transaction record in the block further comprises a hash value identifying a previous transaction record in the block.

7. The method of claim 1, wherein the symmetric key generated for the first party is valid for the time period of the block of transaction records.

8. The method of claim 1, wherein the first subset of the plurality of transactions and the second subset of the plurality of transactions each comprise two or more transactions.

9. The method of claim 1, wherein the generated header comprises N different sets of encrypted symmetric keys corresponding to encrypted details of transactions involving N different parties that are included in the block of transaction records, wherein each set of encrypted symmetric keys comprises one or more encrypted symmetric keys generated by encrypting a symmetric key for one of the N different parties.

10. The method of claim 9, wherein a set of encrypted symmetric keys specific for a party comprises an encrypted symmetric key for an external system that is generated by encrypting a symmetric key for the party using a public key assigned to the external system, and wherein the external system is adapted to use encrypted symmetric keys for the external system across the N different sets of encrypted symmetric keys to decrypt encrypted details of transactions involving the N different parties included in the block of transaction records.

11. A non-transitory computer-readable medium comprising computer program code that, when executed by a processor of a computer system, causes the processor to:
   generate, by a symmetric key generation module of a central service provider, a first symmetric key for a first party and a second symmetric key for a second party;
   encrypt the first symmetric key using a public key assigned to the first party and the second symmetric key using a public key assigned to the second party;
   generate a header comprising the encrypted first symmetric key and the encrypted second symmetric key;
   receive details for each of a plurality of transactions, a first subset of the plurality of transactions involving the first party and a second subset of the plurality of transactions involving the second party;
   encrypt details of each of the transactions in the first subset using the first symmetric key generated for the first party;
   encrypt details of each of the transactions in the second subset using the second symmetric key generated for the second party;
   generate a block of transaction records for a time period corresponding to the received transactions, the block of transaction records comprising the encrypted details of transactions in the first subset and the encrypted details of transactions in the second subset; and
   transmit the header and the block of transaction records to a client device of the first party, the client device of the first party adapted to use the transmitted header to decrypt the encrypted details of the first subset of the plurality of transactions involving the first party in the block of transaction records and unable to use the transmitted header to decrypt the encrypted details of the second subset of the plurality of transactions involving the second party.

12. The non-transitory computer-readable medium of claim 11, further comprising computer program code that, when executed by the processor of the computer system, causes the processor to transmit the header and the block of transaction records to a client device of the second party, the client device of the second party adapted to use the transmitted header to decrypt the encrypted details of the second subset of the plurality of transactions involving the second party in the block of transaction records and unable to use the transmitted header to decrypt the encrypted details of the first subset of the plurality of transactions involving the first party.

13. The non-transitory computer-readable medium of claim 11, wherein the header further comprises:

an encrypted symmetric key for an external system generated by encrypting the first symmetric key for the first party using a public key of the external system.

14. The non-transitory computer-readable medium of claim 13, further comprising computer program code that, when executed by the processor of the computer system, causes the processor to transmit the header and the block of transaction records to the external system.

15. The non-transitory computer-readable medium of claim 11, wherein each transaction record in the block comprises an envelope comprising a digital signature.

16. The non-transitory computer-readable medium of claim 11, wherein each transaction record in the block further comprises a hash value identifying a previous transaction record in the block.

17. The non-transitory computer-readable medium of claim 11, wherein the symmetric key generated for the first party is valid for the time period of the block of transaction records.

18. The non-transitory computer readable medium of claim 11, wherein the first subset of the plurality of transactions and the second subset of the plurality of transactions each comprise two or more transactions.

19. The non-transitory computer readable medium of claim 11, wherein the generated header comprises N different sets of encrypted symmetric keys corresponding to encrypted details of transactions involving N different parties that are included in the block of transaction records, wherein each set of encrypted symmetric keys comprises one or more encrypted symmetric keys generated by encrypting a symmetric key for one of the N different parties.

20. The non-transitory computer readable medium of claim 19, wherein a set of encrypted symmetric keys specific for a party comprises an encrypted symmetric key for an external system that is generated by encrypting a symmetric key for the party using a public key assigned to the external system, and wherein the external system is adapted to use encrypted symmetric keys for the external system across the N different sets of encrypted symmetric keys to decrypt encrypted details of transactions involving the N different parties included in the block of transaction records.

* * * * *